(12) United States Patent
Yang (10) Patent No.: US 8,707,041 B2
(45) Date of Patent: *Apr. 22, 2014

(54) PROTECTING A BSF ENTITY FROM ATTACK (75) Inventor: Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

This patent is subject to a terminal disclaimer.

(21) Appl. No.: 13/491,248

(22) Filed: Jun. 7, 2012

(65) Prior Publication Data

US 2012/0246464 A1    Sep. 27, 2012

Related U.S. Application Data

(63) Continuation of application No. 12/208,375, filed on Sep. 11, 2008, now Pat. No. 8,230,213, which is a continuation of application No. PCT/CN2007/000768, filed on Mar. 9, 2007.

(30) Foreign Application Priority Data

Mar. 14, 2006   (CN) .......................... 2006 1 0064822

(51) Int. Cl.
*H04L 9/32*    (2006.01)
(52) U.S. Cl.
USPC ............................ 713/169; 709/229; 455/411
(58) Field of Classification Search
USPC .......... 709/227, 229; 713/155, 168–169, 171;
726/2–4, 26–27, 30; 380/259, 262,
380/277–279, 282–283, 285; 455/411
See application file for complete search history.

(56) References Cited

U.S. PATENT DOCUMENTS 7,353,388 B1   4/2008   Gilman et al.
7,558,957 B2   7/2009   Patel
(Continued)

FOREIGN PATENT DOCUMENTS

CN            1642079       7/2005
CN         101218800 A      7/2008
(Continued)

OTHER PUBLICATIONS

Written Opinion of the International Searching Authority issued in corresponding PCT Patent Application No. PCT/CN2007/000768, mailed Jun. 28, 2007.

(Continued)

*Primary Examiner* — Saleh Najjar
*Assistant Examiner* — Eric W Shepperd
(74) *Attorney, Agent, or Firm* — Brinks Gilson & Lione (57) ABSTRACT

A method, system and apparatus for protecting a bootstrapping service function (BSF) entity from attack includes: a first temporary identity and a second temporary identity are generated after a BSF entity performs a mutual authentication with a user equipment (UE) by using an initial temporary identity sent from the UE; the BSF entity receives a re-authentication request carrying the first temporary identity from the UE; and the UE sends a service request carrying the second temporary identity to a network application function (NAF) entity. The present disclosure prevents attackers from intercepting the temporary identity at the Ua interface and using the temporary identity to originate a re-authentication request at the Ub interface, thus protecting the BSF entity from attack and avoiding unnecessary load on the BSF entity and saving resources.

8 Claims, 3 Drawing Sheets

(56) References Cited

U.S. PATENT DOCUMENTS

| | | | |
|---|---|---|---|
| 2004/0102242 | A1 | 5/2004 | Poelmann et al. |
| 2005/0102501 | A1 | 5/2005 | Haukka et al. |
| 2005/0278420 | A1 | 12/2005 | Hartikainen et al. |
| 2006/0053300 | A1 | 3/2006 | Noguchi |
| 2006/0101270 | A1 | 5/2006 | Laitinen |
| 2006/0174117 | A1 | 8/2006 | Laitinen |
| 2006/0205387 | A1* | 9/2006 | Laitinen ............... 455/411 |
| 2006/0205388 | A1 | 9/2006 | Semple |
| 2006/0236116 | A1 | 10/2006 | Patel |
| 2006/0265339 | A1* | 11/2006 | Vakil et al. ............. 705/76 |
| 2007/0050365 | A1* | 3/2007 | Laitinen et al. .......... 707/9 |
| 2007/0050623 | A1 | 3/2007 | Huang |

FOREIGN PATENT DOCUMENTS

| | | |
|---|---|---|
| EP | 1633108 | 3/2006 |
| JP | 2000-115161 | 4/2000 |
| WO | WO 2005/107213 A1 | 11/2005 |
| WO | 2007/008120 A1 | 1/2007 |

OTHER PUBLICATIONS

3GPP, "3$^{rd}$ Generation Partnership Project; Technical Specification Group Services and System Aspects; Generic Authentication Architecture (GAA); Generic Bootstrapping Architecture" (Release 6) 3GPP TS 33.220, V6.7.0, Dec. 2005.

Chinese Office Action dated Sep. 25, 2009 regarding Application No. 200610064822.1. Translation provided by Huawei Technologies Co., Ltd.

International Search Report for International Application No. PCT/CN2007/000768, dated Jun. 2, 2007, with English Translation.

Supplementary European Search Report dated Oct. 27, 2009 regarding Application No. EP 07711073.

3GPP TS ab.cde. Vo. 3.0: 3$^{rd}$ Generation Partnership Project: Technical Specification Group Services and System Aspects, Oct. 1, 2003, pp. 1-28.

Extended European Search Report issued in corresponding European Patent Application No. 12192326.2, mailed May 14, 2013.

* cited by examiner

Figure 3

PROTECTING A BSF ENTITY FROM ATTACK

CROSS-REFERENCE TO RELATED APPLICATIONS

This application is a continuation of U.S. patent application Ser. No. 12/208,375, filed on Sep. 11, 2008, which is a continuation of International Application No. PCT/CN2007/000768, filed Mar. 9, 2007. The International Patent Application claims priority of Chinese Application No. 200610064822.1, filed Mar. 14, 2006. The entire disclosures of each of the above applications are incorporated herein by reference.

FIELD

The present disclosure relates to the generic authentication architecture (GAA) security technology, and in particular, to a method, system and apparatus for protecting a bootstrapping service function (BSF) entity from attack.

BACKGROUND

This section provides background information related to the present disclosure which is not necessarily prior art.

In the third-generation wireless telecommunications standard, the GAA is a generic architecture that is used by multiple application service entities to authenticate the user identity. The GAA can be used to check and authenticate the identity of a user of an application service. The foregoing multiple application services include multicast/broadcast services, user license services, instant messaging services, and agent services.

Figure 1:
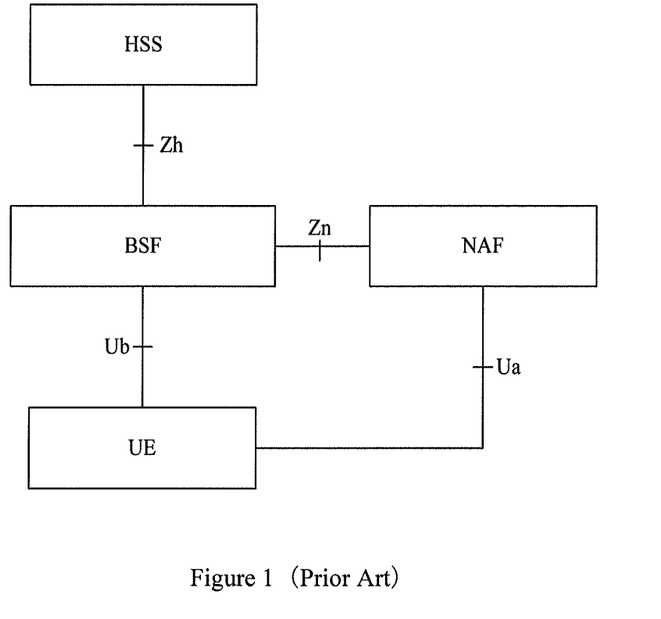
FIG. 1 shows the GAA architecture in the prior art.

FIG. 1 shows the GAA in the prior art. As shown in FIG. 1, the GAA consists of a user, a BSF entity that performs initial authentication of the user identity, a home subscriber server (HSS), and a network application function (NAF) entity. Hereinafter the BSF entity is referred to as "BSF" and the NAF entity is referred to as "NAF". The BSF and the user authenticate each other mutually. During the mutual authentication, the identity is verified mutually, and a shared key is generated for the BSF and the user. The mutual authentication process is also known as a bootstrapping process or a GBA process. The user capable of implementing the GBA process with the BSF is known as a GBA-enabled user. The HSS stores a profile that describes the user information (user profile), and also provides the function of generating authentication information. The NAF can represent different network application function entities. To implement a service, the user must access the NAF corresponding to the service, and communicate with the NAF. The interfaces between the entities are shown in FIG. 1. The BSF is connected to the NAF through a Zn interface; the user is connected to the BSF or the NAF through a user equipment (UE); the UE is connected to the BSF through a Ub interface, and connected to the NAF through a Ua interface.

To use a service, namely, to access the NAF corresponding to the service, the user performs the bootstrapping process at the BSF through the UE if the user knows that the service needs mutual authentication at the BSF. Otherwise, the user first originates a connection request to the NAF corresponding to the service. If the NAF adopts a GAA (namely, supports the GAA function) and finds that the user that originates the connection request has not performed mutual authentication at the BSF, the NAF notifies the user to perform the bootstrapping process at the BSF.

Subsequently, the user performs mutual authentication with the BSF by implementing a bootstrapping process between the UE and the BSF. The UE sends an authentication request to the BSF. This authentication request carries the user's private identity (for example, IP multimedia private identity, referred to as "IMPI" herein) or carries an IMPI derived from an international mobile subscriber identifier (IMSI). After receiving the authentication request from the user, the BSF acquires the authentication information of the user from the HSS. The authentication request message sent by the BSF to the HSS also carries an IMPI. According to the IMPI of the user, the HSS searches out the authentication information, generates authentication vectors and returns the vectors to the BSF. The BSF performs mutual authentication and key negotiation with the UE according to the acquired authentication information. Upon completion of the bootstrapping process, the UE and the BSF authenticate each other and generate a shared key "Ks". The BSF defines a validity period "Key-lifetime" for the shared key "Ks", and allocates a temporary identity, for example, a B-TID, to the user; the BSF and the UE store the shared key "Ks", the B-TID, and the validity period correlatively. When the user wants to communicate with the NAF, the UE sends a connection request carrying the B-TID to the NAF again. The UE calculates out the derivative key "NAF specific key" through a preset derivative algorithm according to the shared key "Ks".

After receiving the connection request, the NAF sends a query request message to the BSF to search for the B-TID if it fails to find the B-TID locally, where the message carries the identity of the NAF and this B-TID. If the BSF fails to find the B-TID locally, the BSF notifies the NAF that no information about the user is available. In this case, the NAF notifies the user to perform mutual authentication at the BSF. If the BSF finds the B-TID, the BSF calculates the derivative key of the shared key "Ks" through the same derivative algorithm as applied at the user side, and then sends a success response message to the NAF. The success response message carries the B-TID, the derivative key corresponding to the B-TID, and the validity period of the shared key "Ks". After receiving the success response message from the BSF, the NAF regards the user as a legal user that has passed the BSF authentication. The NAF shares the derivative key calculated from the shared key "Ks". This derivative key is the same as the derivative key calculated out by the user according to the shared key "Ks". In the subsequent access to the NAF, the user uses the derivative key to protect the communications with the NAF.

When the user discovers that the shared key "Ks" will soon expire, or the NAF requires the user to perform mutual authentication at the BSF again, the user repeats the foregoing mutual authentication steps at the BSF to obtain a new shared key "Ks" and a new "B-TID".

In current practice, the IMPI carried in the authentication request is sent in the form of plain text, which makes the user's IMPI vulnerable to wiretap. For every re-authentication request received, the BSF acquires a group of authentication vectors from the HSS. After a malicious attacker acquires the IMPIs of multiple users through wiretap, if the attacker uses such IMPIs to send re-authentication requests to the BSF, the BSF needs to acquire authentication vectors from the HSS continuously after receiving the IMPIs of multiple users. As long as the attacker uses the IMPI to send re-authentication requests continuously, the BSF will acquire authentication vectors from the HSS continuously so that the BSF will be attacked maliciously.

A solution to the foregoing problem in the prior art is: If the UE has a valid temporary identity (such as TMPI, B-TID), the temporary identity will be used to replace the IMPI in the request, so as to reduce the frequency of using the IMPI at the Ub interface and avoid IMPI interception. Because temporary identities are frequently used at the Ua interface, however, attackers may intercept temporary identities from the Ua interface, and use the temporary identities to attack the BSF through the Ub interface. Therefore, the prior art does not protect the BSF from malicious attack effectively.

SUMMARY

This section provides a general summary of the disclosure, and is not a comprehensive disclosure of its full scope or all of its features.

The embodiments provide a method, system and apparatus for protecting a bootstrapping service function (BSF) entity from attack, and a BSF entity, with a view to effectively protecting the BSF entity from attack.

Various embodiments provides a method for protecting a BSF entity from attack, including: obtaining, a first temporary identity and a second temporary identity, after a user equipment (UE) performing mutual authentication with the BSF entity, where the first temporary identity is different from the second temporary identity; generating, by the UE, a re-authentication request to the BSF entity through the first temporary identity; and originating, by the UE, a service request to a network application function (NAF) entity through the second temporary identity.

Various embodiments provides a system for protecting a BSF entity from attack, including: a user equipment (UE) is adapted to obtain a first temporary identity and a second temporary identity, wherein the first temporary identity is different from the second temporary identity; and The UE is adapted to send a re-authentication request to the BSF entity through the first temporary identity, and originate a service request to the NAF through the second temporary identity.

Various embodiments further provide an apparatus for protecting a BSF entity from attack, including: a first module, adapted to acquire a first temporary identity and a second temporary identity; and a second module, adapted to originate a re-authentication request to a BSF entity through the first temporary identity acquired by the first module, and originate a service request to a NAF entity through the second temporary identity acquired by the first module.

As seen from the foregoing technical solution, after the UE finishes mutual authentication with the BSF, the embodiments generate two different temporary identities for the mutual authentication and key negotiation process, one for the UE to originate a re-authentication request to the BSF, and one for the UE to originate a service request to the NAF. Therefore, the embodiments may prevent attackers from intercepting temporary identities (such as TMPI and B-TID) at the Ua interface and using the temporary identities to originate re-authentication requests at the Ub interface, thus protecting the BSF from attack effectively, avoiding unnecessary load on the BSF and saving resources.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In various embodiments, after the UE finishes mutual authentication with the BSF, two different temporary identities may be generated for the mutual authentication, one for the UE to originate a re-authentication request to the BSF and one for the UE to originate a service request to the NAF.

In order to make the objective, technical solution and merits of the present disclosure clearer, the present disclosure is hereinafter described in detail with reference to accompanying drawings and preferred embodiments.

Figure 2:
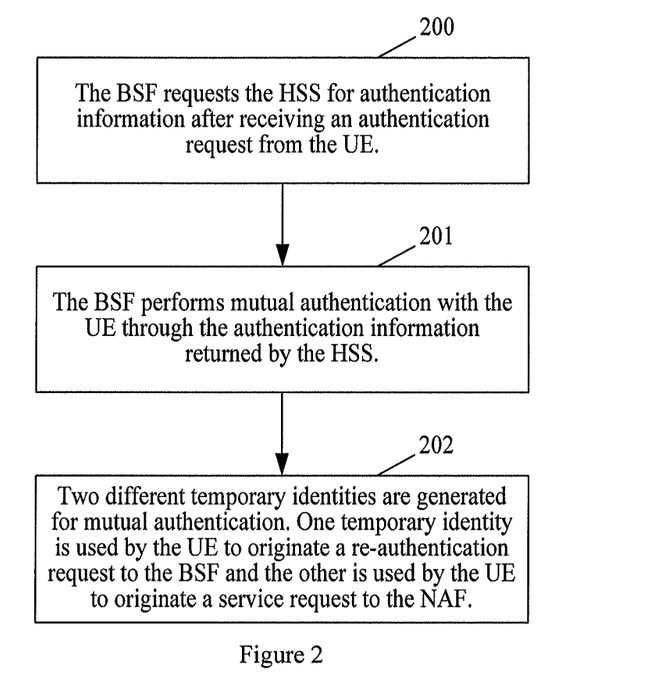
FIG. 2 is a flowchart of protecting the BSF from attack according to an embodiment.

FIG. 2 is a flowchart of protecting the BSF from attack according to an embodiment. This embodiment includes the following:

Block 200: The BSF requests the HSS for authentication information after receiving an authentication request from the UE.

If the user has acquired a valid temporary identity (such as TMPI and B-TID), the authentication request carries the temporary identity; if the user has no valid temporary identity, the authentication request carries the user's private identity such as an IMPI. With the temporary identity carried in the authentication request, the user's private identity is prevented from being intercepted.

If the authentication request received by the BSF carries the user's private identity, such as an IMPI, the private identity is used to request the HSS for authentication information such as authentication vectors.

If the authentication request received by the BSF carries a temporary identity, the BSF further checks whether the BSF itself stores any record which is stored correlatively with the temporary identity. If so, the BSF searches out the user's private identity such as an IMPI stored correlatively with the temporary identity, and requests the HSS for authentication information such as authentication vectors through the private identity. If no record is stored correlatively with the temporary identity, the BSF finishes the authentication process, or the BSF returns an error indication to the UE to notify the user of the authentication failure and finishes the authentication process. The error indication may carry error causes. In this way, even if an attacker intercepts the temporary identity when the UE uses a temporary identity to originate an authentication request, the attacker is unable to attack the BSF maliciously, because the UE obtains a new temporary identity after the UE is authenticated successfully, and the BSF also stores a record stored correlatively with the new temporary identity; therefore, the BSF is unable to find the user's private identity through the temporary identity provided by the attacker, and will not authenticate the attacker.

Block 201: The BSF performs mutual authentication with the UE through the authentication information returned by the HSS.

While the BSF performs mutual authentication (namely, bootstrapping) with the UE, the UE and the BSF authenticate each other and generate a shared key "Ks". Meanwhile, the user calculates the derivative key "NAF specific key" through a preset derivative algorithm according to the generated "Ks" key. Block 201 is implemented in the same way as in the prior art, and is not described further.

Block 202: Two different temporary identities are generated for mutual authentication (a temporary identity may be a B-TID or a TMPI). One temporary identity is used by the UE to originate a re-authentication request to the BSF and the other is used by the UE to originate a service request to the NAF.

In this process, after mutual authentication is performed, the BSF stores the two generated temporary identities correlatively with the private identity (such as IMPI) of the user who originates the authentication request. One temporary identity is used to identify the user in the service request at the Ua interface, and the other is used to identify the user in the re-authentication that occurs at the Ub interface.

In this embodiment, B-TID1 and B-TID2 represent two different temporary identities, which are generated in the following methods:

Method 1: B-TID1 and B-TID2 are generated by the BSF.

Generally, the variable value "RAND" transmitted in the mutual authentication may be used to generate a B-TID through Base64encode (variable value "RAND")+BSF domain name. Base64encode is an encoding mode, which converts a number into strings, each string consisting of six bits. Every two strings are linked by an operator "+". To prevent attackers from intercepting the variable value "RAND" in the mutual authentication process and further inferring the B-TID value, this embodiment may further generate two different B-TID values in the following way:

B-TID1=Base64encode (hash (RAND+random value "RANDx"))+BSF domain name, in which the random value "RANDx" is generated by the BSF randomly. It should be understood that a B-TID1 can be generated through the random value "RANDx" in many ways. In this embodiment, the B-TID1 is obtained through the random value "RANDx" generated randomly by the BSF rather than through the variable value "RAND" transmitted in the mutual authentication. Thus, attackers are unable to intercept the variable value "RAND" in the mutual authentication process and further infer the B-TID value.

B-TID2="ID_"+Base64encode (hash (RAND+random value RANDy))+BSF domain name. It should be understood that a B-TID2 can be generated through the random value "RANDy" in many ways. In this embodiment, the B-TID2 is obtained through the random value "RANDy" generated randomly by the BSF rather than through the variable value "RAND" transmitted in the mutual authentication. Thus, attackers are unable to intercept the variable value "RAND" in the mutual authentication process and further infer the B-TID value.

The random value "RANDy" is generated randomly by the BSF. The B-TID2 may be Base64encode (preset value RANDz)+preset feature string, for example, B-TID2=Base64encode (hash (RANDz+random value RANDy))+"ID"+BSF domain name.

In the foregoing formula, "hash" means Hash operation, and "ID_" means a preset additional string. To reduce the probability of generating the same B-TID in two bootstrapping processes, a string is added to either B-TID, for example, B-TID2, to differentiate the B-TID1 from the B-TID2 formally. For example, if the value obtained from Hash (RAND+ another random value specified by the BSF "RANDx") contains 256 digits, the B-TID has 2256 values. Two B-TID values need to be allocated in a Bootstrapping process. If no measure is taken to differentiate the B-TID1 from the B-TID2 formally, the same B-TID will more probably be allocated in two Bootstrapping processes, and the number of users served by the BSF will decrease. Therefore, this embodiment adds a string to a B-TID to differentiate between B-TIDs, thus avoiding decrease of users concurrently servable by the BSF due to an extra B-TID allocated in each bootstrapping process.

Alternatively, in the re-authentication at the Ub interface, the B-TID itself is a Base64encode value (random value "RANDy") exclusive of the BSF domain name. With the B-TID used on the Ub interface, it is not necessary to find the BSF according to the BSF domain name included in the B-TID. Therefore, the BSF domain name is not required, and the two B-TIDs can be differentiated without the BSF domain name.

Method 2: The temporary identity (such as TMPI, B-TID) is generated locally by the BSF and the UE respectively through the same parameters.

The BSF and the UE use the information acquired in the Bootstrapping process, for example, the shared key "Ks", or the derivative key "NAF specific key", to generate a temporary identity. Likewise, to prevent attackers from intercepting the variable value "RAND" in the mutual authentication process and further inferring a temporary identity, the BSF and the universal integrated circuit card (UICC) in a GBA_U may generate a temporary identity respectively in the following way: B-TID=base64encode(derivation(CK∥IK))@BSF_ servers_domain_name In the foregoing formula, CK and IK are keys generated in the mutual authentication, and the BSF_servers_domain_ name is the domain name of the BSF server. Two different temporary identities may be obtained through two different derivation functions or two different parameters of the same function.

Further, to simplify calculation of the temporary identity generated by the UICC, the derivation (CK∥IK) may reuse the key derivation function (KDF). If the two private identities are represented by B-TID1 and B-TID2, the B-TID1 and the B-TID2 are generated in the following way:

B-TID1=base64encode (KDF (CK, IK, "Ua usage", RAND, BSF_name))@BSF_servers_domain_name, where RAND is a variable value transmitted in the mutual authentication, and BSF_name is the name of the BSF.

B-TID2="ID_"+base64encode (KDF (CK, IK, "Ub usage", RAND, BSF_name))@BSF_servers_domain_name, where the string "Ua usage" and the string "Ub usage" are special strings that are preset for the purpose of obtaining two different key values from the KDF through the same parameters.

In this generation method, the "ID_" may also be appended to base64encode (KDF (CK, IK, "Ub usage", RAND, BSF_name)).

Method 3: One temporary identity (such as B-TID) is generated by the BSF and the UE locally, and the other temporary identity is generated by the BSF locally and sent to the UE. The BSF and the UE generate a temporary identity locally in the same way as the second method mentioned above. The BSF generates the other temporary identity locally in the same as the first method mentioned above. For example, the temporary identity for identifying the user at the Ua interface is acquired by the BSF according to the RAND used in the process of mutual authentication with the UE, and sent to the UE; the temporary identity for use at the Ub interface is obtained by the BSF and the UE through calculation.

It should be understood that for the GBA_ME process, the foregoing UE refers to the mobile equipment (ME) itself. For the GBA_U process, the foregoing UE refers to the universal integrated circuit card (UICC) in the ME. In the GBA_U process, the keys "CK" and "IK" at the UE side and the keys deriving from those two keys are generated by the UICC, and stored in the UICC rather than being sent to the ME. Therefore, for the GBA_U process, the UE generates the temporary identity (such as B-TID) in the UICC.

In this process, after two B-TIDs are generated, if the foregoing first method is used to generate the B-TID (including B-TID1 and B-TID2), the BSF further encrypts the B-TID and sends it to the UE, indicating that the B-TID is encrypted. It should be understood that the B-TID can be encrypted in many ways. The specific encrypting method is independent of this embodiment. The purpose of encryption is to ensure the security of B-TID transmission. Further, to be compatible with the UE of the R6 version, if the UE is unable to identify the B-TID sent from the BSF, the BSF needs to send a B-TID of the R6 version, namely, use the RAND value generated in the mutual authentication and key negotiation process as a B-TID. When both the network and the UE adopt the method provided in this embodiment, it is unnecessary to send a B-TID of the R6 version to the UE.

If the foregoing second and third methods are used to generate a B-TID (including B-TID1 and B-TID2), the BSF sends a B-TID generation indication to the UE, instructing the UE to generate the B-TID in the same way as the BSF. Further, to be compatible with the UE of the R6 version, if the UE is unable to identify the B-TID sent from the BSF, the BSF needs to send a B-TID of the R6 version, namely, use the RAND value generated in the mutual authentication and key negotiation process as a B-TID. When both the network and the UE adopt the method provided in this embodiment, it is unnecessary to send a B-TID of the R6 version to the UE.

Subsequently, the UE processes the two received B-TIDs to ensure them to be available at the time of requesting re-authentication or accessing the NAF. For the GBA_ME process, if the UE receives an encrypted B-TID (including B-TID1 and B-TID2), the UE decrypts the received B-TID (including B-TID1 and B-TID2), and stores the decrypted B-TID1 and B-TID2; if the UE receives a B-TID generation indication, the UE generates a B-TID (including B-TID1 and B-TID2) locally in the same way as the BSF and saves it.

For the GBA_U process, (i) if the ME receives an encrypted B-TID (including B-TID1 and B-TID2), the ME forwards the encrypted B-TID to the UICC, and the UICC decrypts the received B-TID (including B-TID1 and B-TID2) and stores the decrypted B-TID1 and B-TID2; the UICC sends the decrypted B-TID (including B-TID1 and B-TID2) to the ME, and the ME stores the received B-TID1 and B-TID2; (ii) if the ME receives a B-TID generation indication, the ME generates a B-TID (including B-TID1 and B-TID2) locally in the same way as the BSF; the UICC stores the generated B-TID (including B-TID1 and B-TID2) and sends the B-TID to the ME; and the ME stores the received B-TID1 and B-TID2.

Hence, the B-TID used for sending a service request to the NAF through the Ua interface is different from the B-TID used for sending a re-authentication request to the BSF through the Ub interface. This protects the BSF from attack effectively, avoids unnecessary load on the BSF and saves resources.

Moreover, this embodiment adds a string to a B-TID to differentiate between B-TIDs, thus avoiding decrease of users concurrently servable by the BSF due to an extra B-TID allocated in each bootstrapping process.

Figure 3:
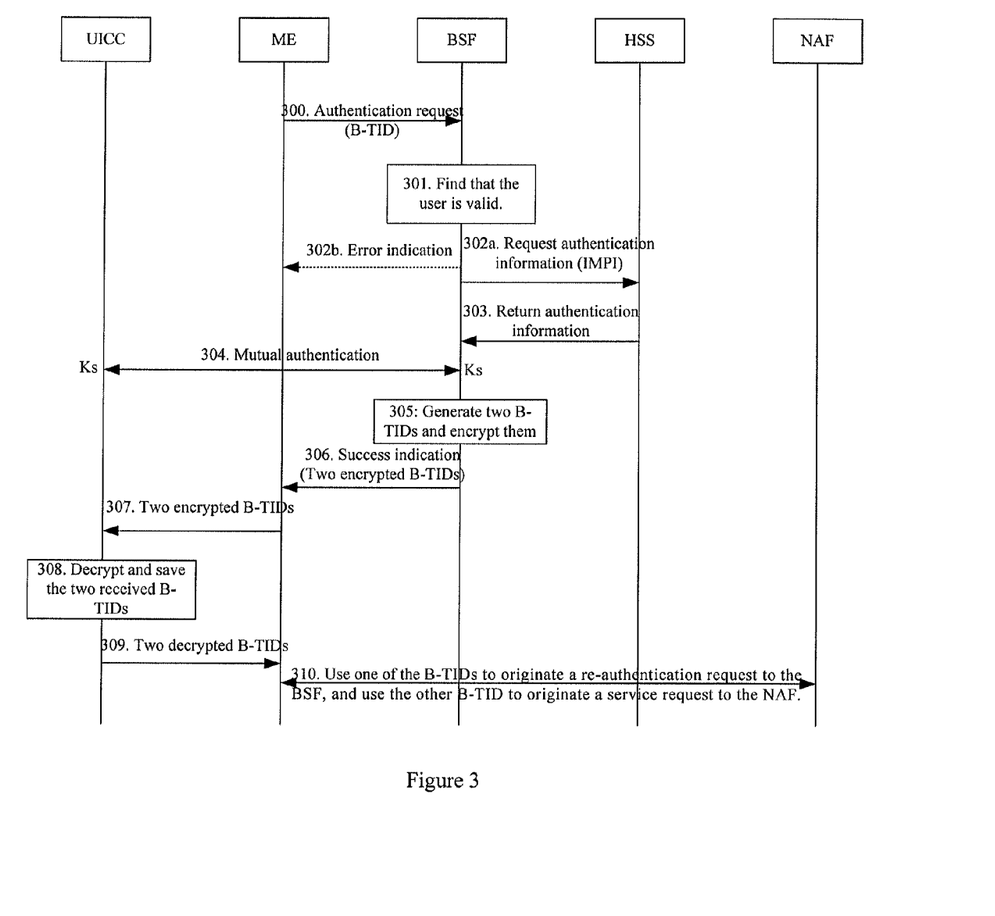
FIG. 3 is a flowchart of protecting the BSF from attack according to another embodiment.

FIG. 3 is a flowchart of protecting the BSF from attack in an embodiment. Taking the GBA_U process as an example, this embodiment elaborates on the method of the present disclosure. As shown in FIG. 3, suppose that the authentication request sent by the ME is a re-authentication request, and the ME stores a valid temporary identity (such as B-TID) and the BSF stores the IMPI of the ME corresponding to the B-TID. The method includes the following:

Block 300: The ME sends an authentication request to the BSF, carrying the B-TID.

Block 301: According to the received B-TID, the BSF detects that the BSF itself stores an IMPI of the ME corresponding to the B-TID, which indicates that the ME is a valid user.

Block 302a: The BSF puts the IMPI corresponding to the B-TID into the request for authentication information, and sends the request to the HSS to acquire authentication information such as authentication vectors.

If the BSF fails to find the IMPI corresponding to the B-TID in the BSF according to the received B-TID, the BSF proceeds to block 302b. That is, the BSF returns an error indication to the ME, and finishes the authentication process.

Blocks 303-304: The HSS returns authentication vectors to the BSF, and the BSF uses the returned authentication information to perform mutual authentication and key negotiation with the ME.

The specific implementation of this process is the same as block 201, and is not described further.

Block 305: The BSF generates two B-TIDs and encrypts them.

This embodiment assumes that the first method in block 202 is used to generate the B-TID, and the specific generation method is not described further.

Block 306: The BSF puts the two encrypted B-TIDs into a success indication message, and sends the message to the ME.

Block 307: The ME puts the two encrypted B-TIDs into an APDU command, and forwards the command to the UICC.

Block 308: The UICC decrypts the two received B-TIDs, and stores the two decrypted B-TIDs.

Block 309: The UICC returns the two decrypted B-TIDs to the ME, and the ME stores the two received B-TIDs.

Block 310: The ME uses one of the B-TIDs to originate a re-authentication request, and uses the other B-TID to originate a service request to the NAF.

As seen from the foregoing embodiment, to prevent attackers from intercepting the IMPI, the B-TID may be carried in the re-authentication request; to prevent attackers from intercepting the B-TID at the Ua interface and using the B-TID to originate re-authentication requests at the Ub interface, the BSF generates two different B-TIDs in the authentication of the UE, one for authentication of the UE at the Ua interface and one for authentication of the UE at the Ub interface. In this way, the B-TID used for requesting services at the Ua interface is different from the B-TID used for requesting re-authentication at the Ub interface. This protects the BSF from attack effectively, avoids unnecessary load on the BSF, and saves resources.

Further, in the process of generating a B-TID, to prevent the B-TID from being intercepted, two methods may be applied: (1) Both B-TID1 and B-TID2 are generated by the BSF, decrypted and sent to the UE; (2) two different B-TIDs are generated by the BSF and the UE respectively in the same way after completion of the Bootstrapping process; or one B-TID is generated by the BSF and the UE respectively in the same way, and the other B-TID is generated by the BSF, encrypted and sent to the UE. This protects the BSF from attack effectively, avoids unnecessary load on the BSF, saves resources, and prevents denial of service (DoS) attack.

A system for protecting a BSF entity from attack provided in an embodiment includes a BSF entity, a UE, and a NAF entity.

In this system, the BSF entity generates two different temporary identities, encrypts them and sends them to the UE; the UE decrypts the received temporary identities, uses one temporary identity to originate a re-authentication request to the BSF through the Ub interface, and uses the other to originate a service request to the NAF entity through the Ua interface; after receiving the service request from the UE, the NAF entity sends its own identity together with the received temporary identity to the BSF to search for the temporary identity if the NAF entity fails to find the temporary identity locally.

The BSF entity stores the temporary identity and the user's private identity correlatively. After receiving the temporary identity carried in the re-authentication request from the UE, the BSF entity checks whether the temporary identity is stored locally. If so, the BSF uses the user's private identity stored correlatively with the B-TID to request the HSS for authentication information and authenticate the UE.

Another system for protecting a BSF entity from attack provided in an embodiment includes a BSF entity, a UE, and a NAF entity.

In this system, the BSF entity generates a temporary identity, encrypts the temporary identity and sends it to the UE; the BSF entity sends a temporary identity generation indication to the UE, instructing the UE to generate the other temporary identity through the parameters obtained in the mutual authentication; meanwhile, the BSF entity generates the other temporary identity in the same way. The UE receives the temporary identity sent from the BSF entity and decrypts it. After receiving the temporary identity generation indication, the UE generates the other temporary identity. Then the UE originates a re-authentication request to the BSF through the Ub interface by using one temporary identity and originates a service request to the NAF entity through the Ua interface by using the other temporary identity. After receiving the service request from the UE, the NAF entity sends its own identity and the received temporary identity to the BSF to search for the temporary identity if the NAF entity fails to find the temporary identity locally.

The BSF entity stores the temporary identity and the user's private identity correlatively. After receiving the temporary identity carried in the re-authentication request from the UE, the BSF entity checks whether the temporary identity is stored locally. If so, the BSF uses the user's private identity stored correlatively with the temporary identity to request the HSS for authentication information and authenticate the UE.

A third system for protecting a BSF entity from attack provided in an embodiment includes a BSF entity, a UE, and a NAF entity.

In this system, the BSF entity generates two different temporary identities, and sends a temporary identity generation indication, instructing the UE to generate two different temporary identities in the same way; after receiving the indication, the UE generates two different temporary identities in the same way as the BSF entity, uses one temporary identity to originate a re-authentication request to the BSF through the Ub interface, and uses the other to originate a service request to the NAF entity through the Ua interface; after receiving the service request from the UE, the NAF entity sends its own identity together with this temporary identity to the BSF to search for the temporary identity if the NAF entity fails to find the temporary identity locally.

The BSF entity stores the temporary identity and the user's private identity correlatively. After receiving the temporary identity carried in the re-authentication request from the UE, the BSF entity checks whether the temporary identity is stored locally. If so, the BSF uses the user's private identity stored correlatively with the temporary identity to request the HSS for authentication information and authenticate the UE.

An apparatus for protecting a BSF entity from attack provided in an embodiment includes:

a first module, adapted to acquire two different temporary identities; and a second module, adapted to originate a re-authentication request to a BSF entity through the first temporary identity acquired by the first module, and originate a service request to a NAF entity through the second temporary identity.

The first module may acquire two different temporary identities in three ways: (1) the first module receives two different temporary identities from the BSF entity; (2) the first submodule in the first module receives the first temporary identity from the BSF entity and receives the temporary identity generation indication from the BSF entity; and the second submodule generates the other temporary identity according to the temporary identity generation indication obtained by the first submodule; (3) the first submodule in the first module receives the temporary identity generation indication from the BSF entity; the second submodule generates two different temporary identities according to the temporary identity generation indication obtained by the first submodule.

According to an embodiment, the apparatus for protecting a BSF entity from attack may be a mobile equipment (ME) or a universal integrated circuit card (UICC) in the mobile equipment.

A BSF entity provided in an embodiment includes a first module, adapted to generate a first temporary identity which is used by the UE to originate a re-authentication request, and a second temporary identity which is used by the UE to originate a service request.

The first module in the BSF entity is further adapted to encrypt the two different generated temporary identities, and send them to the UE; or, send a temporary identity generation indication to the UE, instructing the UE to generate two different temporary identities in the same way; or, encrypt one temporary identity and send it to the UE, and send a temporary identity generation indication to the UE, instructing the UE to generate the other temporary identity.

The BSF entity further includes a second module, adapted to request the HSS for authentication information if the second module finds the temporary identity is stored locally after receiving a re-authentication request from the UE; otherwise, finish the authentication process, or return an error indication to the UE and finish the authentication process.

The components of the system for protecting the BSF entity from attack, the components of the apparatus for protecting the BSF entity from attack, and the functions of the BSF entity have been described earlier in the procedures of the foregoing embodiments, and will not described further.

Although the present disclosure has been described through some exemplary embodiments, the present disclosure is not limited to such embodiments. It is apparent that those skilled in the art can make various modifications and variations without departing from the spirit and scope of the present disclosure. The present disclosure is intended to cover the modifications and variations provided that they fall in the scope of protection defined by the following claims or their equivalents.

What is claimed is:

1. A method for protecting a bootstrapping service function (BSF) entity from attack, comprising:
performing, by a BSF entity, a mutual authentication with a user equipment (UE) by using an initial temporary identity sent from the UE;
generating, by the BSF entity, a first temporary identity and a second temporary identity, wherein the first temporary identity is different from the second temporary identity, and the first and second temporary identities are different from the initial temporary identity;
sending, by the BSF entity, either of the first temporary identity and the second temporary identity to the UE;
sending, by the BSF entity, a temporary identity generation indication to the UE, wherein the temporary identity generation indication is used for instructing the UE to generate an other of the first temporary identity and the second temporary identity by using an algorithm also used by the BSF to generate the other of the first temporary identity and the second temporary identity; and
receiving, by the BSF entity, a re-authentication request carrying the first temporary identity from the UE;
wherein, the UE sends a service request carrying the second temporary identity to a network application function (NAF) entity.

2. The method according to claim 1, further comprising:
generating, by the BSF entity, the either of the first temporary identity and the second temporary identity by using a RAND value generated randomly and the other of the first temporary identity and the second temporary identity by using a key obtained in the mutual authentication;
wherein the UE generates the other of the first temporary identity and the second temporary identity by using the key obtained in the mutual authentication.

3. The method according to claim 1, further comprising:
receiving, by the BSF entity, an authentication request from the UE, wherein the authentication request carries the initial temporary identity;
determining, by the BSF entity, whether the BSF entity stores a user's private identity correlatively with the initial temporary identity; and
if the BSF entity stores the user's private identity, requesting, by the BSF entity, a home subscriber server (HSS) for authentication information through the user's private identity;
otherwise, finishing, by the BSF entity, a current authentication process or sending, by the BSF entity, an error indication to the UE and finishing a current authentication process.

4. The method according to claim 1, wherein the first temporary identity is a temporary multimedia private identity (TMPI), and the second temporary identity is a bootstrapping transaction identifier (B-TID).

5. A bootstrapping service function (BSF) entity, comprising:
a processor configured to perform a mutual authentication with a user equipment (UE) by using an initial temporary identity sent from the UE, and to generate a first temporary identity and a second temporary identity, wherein the first temporary identity is different from the second temporary identity, and the first and second temporary identities are different than the initial temporary identity;
a transmitter configured to send either of the first temporary identity and the second temporary identity to the UE, and send a temporary identity generation indication to the UE, wherein the temporary identity generation indication is used for instructing the UE to generate an other of the first temporary identity and the second temporary identity by using an algorithm also used by the BSF to generate the other of the first temporary identity and the second temporary identity; and
a receiver configured to receive a re-authentication request carrying the first temporary identity from the UE;
wherein the UE is further configured to send a service request carrying the second temporary identity to a network application function (NAF) entity.

6. The BSF according to claim 5, wherein:
the processor is further configured to generate the either of the first temporary identity and the second temporary identity by using a RAND value generated randomly and the other of the first temporary identity and the second temporary identity by using a key obtained in the mutual authentication;
wherein the UE is further configured to generate the other of the first temporary identity and the second temporary identity by using the key obtained in the mutual authentication.

7. The BSF according to claim 5, further comprising:
the receiver is further configured to receive an authentication request from a user equipment (UE), wherein the authentication request carries an initial temporary identity
the processor is further configured to determine whether the BSF entity stores a user's private identity correlatively with the initial temporary identity; and
if the BSF entity stores the user's private identity, the processor is further configured to request a home subscriber server (HSS) for authentication information through the user's private identity;
otherwise, the processor is further configured to finish a current authentication process or send an error indication to the UE and finish a current authentication process.

8. The BSF according to claim 5, wherein the first temporary identity is a temporary multimedia private identity (TMPI), and the second temporary identity is a bootstrapping transaction identifier (B-TID).

* * * * *